June 19, 1928. 1,674,477

K. H. MAY

ELECTRIC APPARATUS

Filed Aug. 9, 1926

Inventor:
Karl H. May,
by
His Attorney.

Patented June 19, 1928.

1,674,477

UNITED STATES PATENT OFFICE.

KARL H. MAY, OF BERLIN, GERMANY, ASSIGNOR TO GENERAL ELECTRIC COMPANY, A CORPORATION OF NEW YORK.

ELECTRIC APPARATUS.

Application filed August 9, 1926, Serial No. 128,124, and in Germany September 11, 1925.

My invention relates to improvements in electric apparatus for alternating current systems and more particularly to improvements in apparatus for electrically determining a negative phase sequence component of a circuit current or potential whereby a condition of phase unbalance may be determined and the circuit controlled when such condition is undesirable or becomes dangerous.

As is well known, the armature field generated by the stator of a three phase dynamoelectric machine is a purely rotating field only when the three phases carry the same current, that is in the case of symmetrical load or phase balance. When, however, the magnitudes of the three currents differ, as in the case of open phase, phase unbalance, or single phase short circuit, the field generated thereby will no longer be at rest relatively to the rotor, but will change in time and space. Consequently in the iron of the rotor as well as in the copper of the magnet and damping windings, there will be induced currents which under certain conditions may dangerously overheat the rotor. It is, therefore, desirable to know the amount of phase unbalance or the extent of the lack of symmetry so that the circuit can be suitably controlled when necessary.

My invention is based on the fact that an unsymmetrical three phase system can be decomposed or resolved into two symmetrical systems, one of which has the same direction of rotation as the unsymmetrical system and is known as the positive phase sequence component. The other system rotates in the opposite direction and is known as the negative phase sequence component. Similarly, the armature ampere turns can be decomposed into a symmetrically synchronously rotating component and a symmetrical component rotating in the opposite direction. The field generated by the latter induces in the rotor the eddy currents which damage the machine. The oppositely directed ampere turns are proportional to the negative phase sequence component of the system current. This component is therefore to be considered as the measure of danger to the machine.

My invention will be better understood from the following description taken in connection with the accompanying drawing and its scope will be pointed out in the appended claims.

Figure 1:
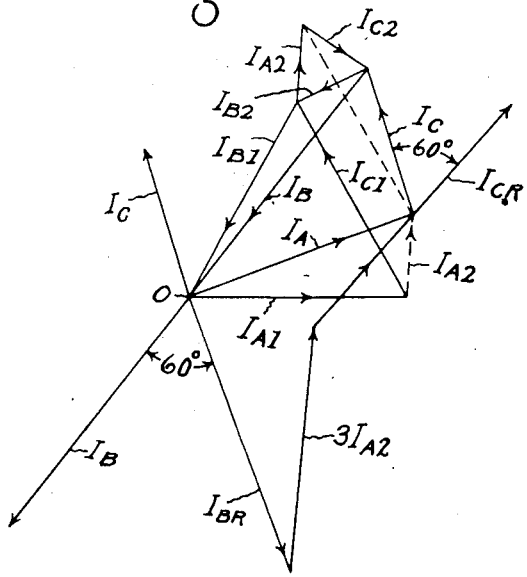
Figure 2:
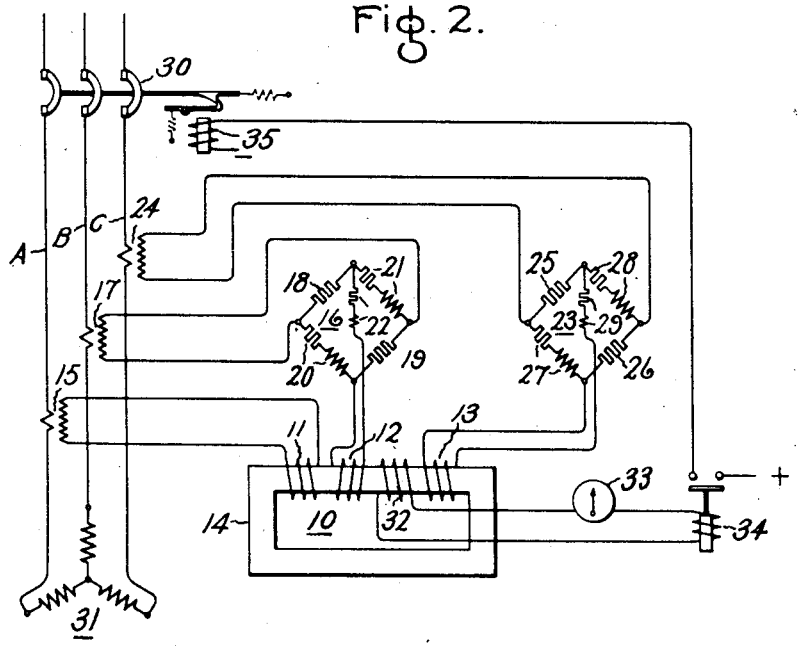

In the accompanying drawing, Fig. 1 is a vector diagram illustrating the decomposition of three unequal and unsymmetrical vectors, without residue, into two symmetrical systems, and Fig. 2 illustrates an arrangement of electric apparatus embodying my invention for electrically determining and applying the negative phase sequence component.

It has been demonstrated that the following relation exists between the negative phase sequence component of the current $I_{A2}$ of a three phase system and the three currents $I_A$, $I_B$, and $I_C$ in the respective phase conductors of the system:

$$(1) \quad 3I_{A2} = I_A + a^2 I_B + a I_C$$

where $$a = \frac{-1 + j\sqrt{3}}{2}$$

is an operator effecting 120° of counter-clockwise rotation and $$a^2 = \frac{-1 - j\sqrt{3}}{2}$$

is an operator effecting 240° of counter-clockwise rotation. We can, therefore, write equation (1) as follows:

$$(2) \quad 3I_{A2} = I_A + \left(\frac{-1-j\sqrt{3}}{2}\right)I_B + \left(\frac{-1+j\sqrt{3}}{2}\right)I_C$$

This in turn can be rewritten as follows:

$$(3) \quad 3I_{A2} = I_A - \left(\frac{1+j\sqrt{3}}{2}\right)I_B - \left(\frac{1-j\sqrt{3}}{2}\right)I_C$$

where $$\frac{1+j\sqrt{3}}{2}$$

is an operator effecting 60° of counterclockwise rotation and $$\frac{1-j\sqrt{3}}{2}$$

is an operator effecting 60° of clockwise rotation.

Referring now to Fig. 1 which represents an unbalanced three phase system by the current vectors $I_A$, $I_B$ and $I_C$ forming a closed polygon, that is there is no residue or zero-phase component, and bearing in mind equation (3), the value of $3I_{A_2}$ may be obtained graphically by summation as follows:—

$I_B$ is rotated 60° counterclockwise to the position $I_{BR}$ and $I_C$ is rotated 60° clockwise to the position $I_{CR}$. These rotated vectors are then geometrically subtracted from the vector $I_A$. The closing line of the polygon or the resultant of this vector summation is the vector $3I_{A_2}$, one third of which is the negative phase sequence component in magnitude and in direction for phase A. The positive phase sequence component $I_{A_1}$ can be obtained by subtracting $I_{A_2}$ from $I_A$. The remainder of the graphical analysis is obvious from the figure.

In accordance with my invention, I provide an arrangement of electric apparatus by means of which the negative phase sequence component is determined electrically instead of by calculation. This means, as shown, is an electromagnetic summation device 10 comprising a plurality of magnetically interlinked windings 11, 12, 13 which are connected and arranged to produce an effect, such as a magnetic flux, proportional to the negative phase sequence component of the current of a three phase circuit comprising phase conductors A, B, C. The windings 11, 12, 13 are mounted on a core 14 and are connected to be energized respectively in accordance with the currents $I_A$, $I_B$, $I_C$ in the respective phase conductors A, B, C, certain of the currents being changed in direction in accordance with the terms of equations (2) or (3) which, as heretofore pointed out, are merely equivalent ways of expressing equation (1).

For example, the winding 11 is connected to be energized in accordance with the current $I_A$ in the phase conductor A. For this purpose, the winding 11 may be connected in series relation with the conductor A through a current transformer 15. The winding 12 is connected to be energized in accordance with the current $a^2 I_B$, that is the current $I_B$ in the phase conductor B turned either 60° or 240°, these being supplementary angles, in a direction opposite to the direction of phase rotation. For this purpose, the winding 12 may be connected in circuit with the conductor B by any suitable means, such as a bridge circuit 16. This bridge circuit is in series relation with the conductor B through a current transformer 17 and is so proportioned by means of suitable resistances 18, 19 and impedances 20 21 as to effect the energization of the winding 12 by a current proportional to $I_B$ turned in the desired direction. For further control of the phase relation an impedance 22 may be connected in series relation with the winding 12. The winding 13 is connected to be energized in accordance with the current $aI_C$, that is the current $I_C$ in the phase conductor C turned either 60° in the direction of phase rotation or 120° in a direction opposite to the direction of phase rotation, these being supplementary angles. For this purpose, the winding 13 may be connected in circuit with the conductor C by any suitable means, such as a bridge circuit 23. This bridge circuit is in series relation with the conductor C through a current transformer 24 and is so proportioned by means of suitable resistances 25, 26 and impedances 27, 28 as to effect the energization of the winding 13 by a current proportional to $I_C$ turned in the desired direction. For further control of the phase relation, an impedance 29 may be connected in series relation with the winding 13.

If the parts are so proportioned and connected that the currents in the windings 12 and 13 are respectively $I_B$ and $I_C$ turned 60° in a direction opposite the direction of phase rotation and 60° in the direction of phase rotation respectively, then the fluxes set up by these windings are subtracted from the flux set up by the winding 11. If, however, the parts are so proportioned and connected that the currents in the windings 12 and 13 are respectively $I_B$ and $I_C$ turned respectively 240° and 120° in a direction opposite to the direction of phase rotation, then the fluxes set up by these windings are added to the flux set up by the winding 11. In either case, the summation produces the same resultant flux as is obvious from equations (2) and (3), and this flux is proportional to the negative phase sequence component of the current.

For indicating the occurrence of a phase unbalance and/or controlling the circuit A, B, C through suitable circuit controlling means 30 whereby to disconnect the machine 31 from the circuit when the condition of phase unbalance becomes dangerous, this resultant flux may be utilized directly in an indicating device and/or a suitable relay or the summation device 10 may take the form of a transformer having a secondary winding 32 for energizing whatever devices it is desired to have operate. The devices may include an indicator, such as an ammeter 33 and a suitable relay such as an over-current relay 34 having their windings in circuit with the secondary winding 32. The relay 34 is arranged to control the circuit of the trip coil 35 of the circuit controlling means 30 whereby to effect the opening of this device when the negative phase sequence component of the current exceeds a definite current value for which the relay 34 is set to operate.

Although I have shown and described my invention in considerable detail, I do not wish to be limited to the exact and specific details thereof as shown and described but seek to cover in the appended claims all those modifications that fall within the true spirit and scope of my invention.

What I claim as new, and desire to secure by Letters Patent of the United States, is:

1. In combination with a polyphase circuit, electromagnetic circuit controlling means controlled in accordance with the phase unbalance of the circuit for producing an effect dependent on the magnitude of the negative phase sequence component of the current comprising a transformer having a plurality of windings respectively connected to be energized in accordance with the current in one phase conductor of the circuit, the current in another phase conductor rotated substantially 60° in the direction of phase rotation and the current in a third phase conductor rotated substantially 60° in the opposite direction.

2. In combination with a three phase circuit, electromagnetic means controlled in accordance with the phase unbalance of the circuit for producing an effect dependent on the magnitude of the negative phase sequence component of the current comprising three windings respectively connected to be energized in accordance with the current in one phase conductor of the circuit, the current in another phase conductor rotated substantially 60° in the direction of phase rotation and the current in the remaining phase conductor rotated substantially 60° in the opposite direction.

3. Means for obtaining a current proportional to the negative phase sequence component of the current in a three phase circuit comprising electromagnetic means having a plurality of windings, one of said windings being connected to be energized in accordance with the current in one phase conductor of the circuit, means for energizing another of the windings in accordance with the current in another phase conductor rotated substantially 60° in the direction of phase rotation comprising a bridge circuit connected in series relation with the other phase conductor, and means for energizing a third winding in accordance with the current in the remaining phase conductor rotated substantially 60° in the opposite direction comprising a bridge circuit connected in series relation with the remaining phase conductor.

4. In combination with a three phase circuit, electromagnetic means controlled in accordance with the phase unbalance of the circuit for producing a flux proportional to $I_A + a^2 I_B + a I_C$, where $I_A$, $I_B$ and $I_C$ are the currents in the respective phase conductors and $a$ equals $$\frac{-1+j\sqrt{3}}{2},$$

comprising three windings connected and arranged to be energized respectively in accordance with $I_A$, $a^2 I_B$ and $a I_C$.

5. In combination with a three phase circuit, electromagnetic means controlled in accordance with the phase unbalance of the circuit for producing an effect dependent on the magnitude of the negative phase sequence component of the current comprising a summation transformer having a secondary winding connected to be energized proportionally to $I_A + a^2 I_B + a I_C$, where $I_A$, $I_B$ and $I_C$ are the currents in the respective phase conductors and $a$ equals $$\frac{-1+j\sqrt{3}}{2},$$

6. In combination with a three phase circuit, electromagnetic means controlled in accordance with the phase unbalance of the circuit for producing an effect dependent on the magnitude of the negative phase sequence component of the current comprising a summation transformer having a secondary winding connected to be energized proportionally to $I_A + a^2 I_B + a I_C$, where $I_A$, $I_B$ and $I_C$ are the currents in the respective phase conductors and $a$ equals $$\frac{-1+j\sqrt{3}}{2},$$

and means for controlling the circuit connected to be energized from said secondary winding.

In witness whereof, I have hereunto set my hand this 15th day of July, 1926.

KARL H. MAY.